(12) United States Patent
Hanada et al.

(10) Patent No.: US 6,369,871 B1
(45) Date of Patent: Apr. 9, 2002

(54) LIQUID CRYSTAL DISPLAY COMPONENT AND TRANSPARENT CONDUCTIVE SUBSTRATE SUITABLE FOR THE SAME

(75) Inventors: Toru Hanada; Isao Shiroishi; Hitoshi Mikoshiba; Toshiaki Yatabe, all of Tokyo (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/601,253
(22) PCT Filed: Nov. 26, 1999
(86) PCT No.: PCT/JP99/06613
  § 371 Date: Jul. 31, 2000
  § 102(e) Date: Jul. 31, 2000
(87) PCT Pub. No.: WO00/33127
  PCT Pub. Date: Jun. 8, 2000

(30) Foreign Application Priority Data
Nov. 30, 1998 (JP) ............................................ 10-339677
Aug. 10, 1999 (JP) ............................................ 11-226237

(51) Int. Cl.$^7$ ........................ G02F 1/1333; C09K 19/00; B32B 9/04
(52) U.S. Cl. ........................ 349/158; 428/1.1; 428/447
(58) Field of Search ................ 349/158, 139; 428/1.1, 447; 524/588; 525/100

(56) References Cited

U.S. PATENT DOCUMENTS 6,171,663 B1 * 1/2001 Hanada et al. .................. 428/1

FOREIGN PATENT DOCUMENTS

| JP | 7-168166 A | * | 7/1995 |
| JP | 8-211376 | | 8/1996 |
| JP | 9-318933 | | 12/1997 |

* cited by examiner

Primary Examiner—William L. Sikes
Assistant Examiner—Tarifur R. Chowdhury
(74) Attorney, Agent, or Firm—Sughrue Mion, PLLC (57) ABSTRACT

The present invention relates to a liquid crystal display component and a transparent conductive substrate suitable as an electrode substrate for the liquid crystal display component. The transparent conductive substrate has the following feature: (i) it comprises a transparent polymer substrate (S), a gas barrier layer (x, a hardened resin layer (U) and a transparent conductive layer (E), (ii) the hardened resin layer (U) and the transparent conductive layer (E) are in contact with each other, and (iii) the surface in contact with the transparent conductive layer (E) of the hardened resin layer (U) has a surface electric resistivity of $1.0 \times 10^{13}$ $\Omega/\square$ or more in an environment of 50° C. and 30% RH and that of $1.0 \times 10^{12}$ $\Omega/\square$ or more in an environment of 50° C. and 90% RH, and the transparent conductive substrate has a high gas barrier property and high stability in a high-temperature and high-humidity environment.

26 Claims, 1 Drawing Sheet

LIQUID CRYSTAL DISPLAY COMPONENT AND TRANSPARENT CONDUCTIVE SUBSTRATE SUITABLE FOR THE SAME

TECHNICAL FIELD

The present invention relates to a liquid crystal display component having high reliability and a transparent conductive substrate useful as an electrode substrate for the liquid crystal display component. Having high gas barrier property and high stability under high temperature and high humidity, the transparent conductive substrate can be used suitably as an electrode substrate in the field of a flat panel display such as a photosensitive conductor, a surface light emitter, an EL-display or the like besides the liquid crystal display component.

BACKGROUND ART

Recently, in the field of a flat panel display such as a liquid crystal display component, there is demand for the improvement of breakage resistance, and weight and thickness reduction. In order to meet the demand, the studies for using a transparent conductive substrate prepared by placing a semiconductor layer of indium oxide, tin oxide, an oxide of tin-indium alloy or the like, a metal layer such as an oxide layer of gold, silver or a palladium alloy, or a layer formed by combining said semiconductor layer and said metal layer as a transparent conductive layer on a film consisting of a transparent polymer, as an electrode substrate of a liquid crystal display component is continuously carried out. For such a substrate, it is required to have high chemical resistance against various organic solvents, acids and alkalis which are used on patterning of electrodes, the lamination of alignment layer and various washings in the assembling process of a panel. Further, it is commonly required to have a high gas barrier property to increase the reliability against bubbles generated inside the liquid crystal cells of the panel. Regarding the gas barrier property, for example, publication WO94/23332, Japanese patent publication 2796573 and Japanese patent publication 2790144 describe substrates having a laminate of an organic gas barrier layer consisting of a vinyl alcohol polymer, a vinylidene chloride polymer or the like, or an inorganic gas barrier layer consisting of silicon oxide, aluminum oxide or the like. However, it is difficult to achieve a gas barrier property, especially a water vapor barrier property equivalent to the glass substrate which conventionally has been used, in cases where the organic or inorganic gas barrier layer is used in a single layer or in a plurally laminated layer, or even in cases where the organic and inorganic gas barrier layers are used in combination. The following trouble actually occurs. That is, when a panel using such a substrate is allowed to stand for a long time in a high-temperature and high-humidity environment, water vapor intrudes into the inside of a liquid crystal cell, the impedances between a pair of electrodes facing each other of the liquid crystal cell and between a pair of adjacent electrodes inside the substrate decrease, and as a result, display defects of the panel such as image bleeding or cross talk are apt to occur.

DISCLOSURE OF THE INVENTION

The object of the present invention is to provide a new liquid crystal display component having high reliability.

Another object of the present invention is to provide a liquid crystal display component resistant to the deterioration of display quality for a long time.

Still another object of the present invention is to provide a transparent conductive substrate suitable for the above-mentioned liquid crystal display component.

Yet another object of the present invention is to provide a new transparent conductive substrate having an excellent gas barrier property.

The inventors of the present invention pursued zealous studies to solve the above-mentioned problem, they found that the problem can be solved by controlling the moisture dependency of the surface insulation resistance of the lower layer in the transparent conductive layer and the gas barrier property of the transparent conductive substrate. The present invention has been completed based on the finding.

That is, the present invention is achieved by a liquid crystal display component comprising a pair of electrode substrates and a liquid crystal layer placed between the electrode substrates, wherein the electrode substrates are characterized in that (i) the electrode substrates comprise each a transparent polymer substrate (S), a gas barrier layer (X), a hardened resin layer (U) and a transparent conductive layer (E), (ii) the hardened resin layer (U) and the transparent conductive layer (E) are in contact with each other, (iii) the substrates have a water absorption coefficient of 2% or less, (iv) they have a water vapor transmission of 0.1 $g/m^2/day$ or less in an environment of 40° C. and 90% RH, and (v) the surface in contact with the transparent conductive layer (E) of the hardened resin layer (U) has a surface electric resistivity of $1.0 \times 10^{13}$ $\Omega/\square$ or more in an environment of 50° C. and 30% RH and that of $1.0 \times 10^{12}$ $\Omega/\square$ or more in an environment of 50° C. and 90% RH.

EXPLANATION OF THE MARKS 11 and 13. A gas barrier laminated film.
15. A sealing material.
17. A liquid crystal cell.
19. A liquid crystal material.
21. A gapping material.
23. A transparent conductive layer.
25. An alignment layer.
27. A transparent conductive layer (E).
29. A hardened resin layer (U).
31. A transparent polymer substrate (S).
33. A hardened resin layer (B).
35. A gas barrier layer (X).
37. A hardened resin layer (C).

BEST MODE FOR CARRYING OUT THE INVENTION

Figure 1:
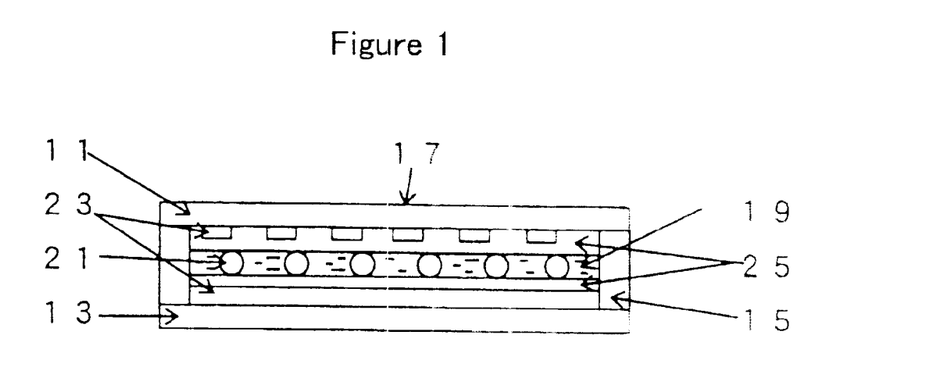
FIG. 1 is a cross section schematically showing a concrete example of a liquid crystal display component.
Figure 2:
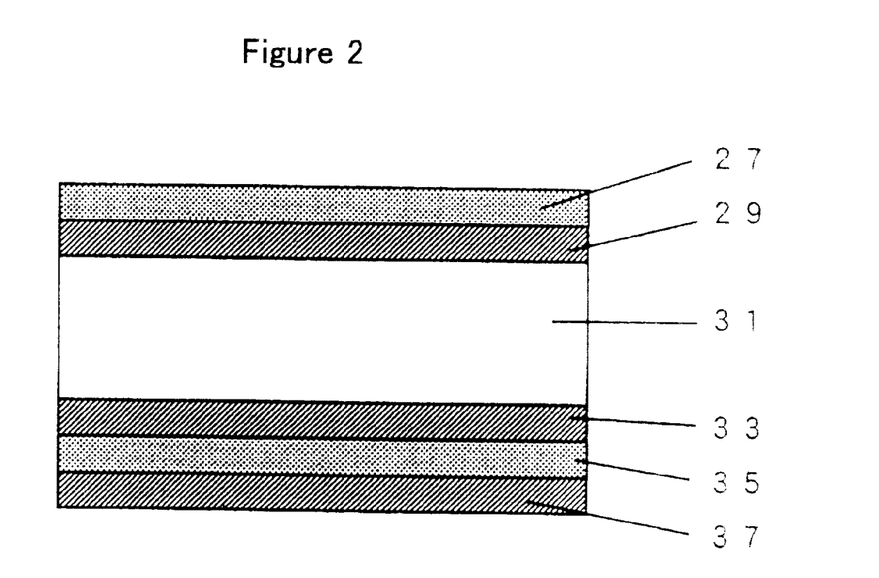
FIG. 2 is a cross section schematically showing a concrete example of a transparent conductive substrate.

The liquid crystal display component of the present invention is constructed mainly of a pair of electrode substrates and a liquid crystal layer placed between the electrode substrates. A representative example is shown in FIG. 1. The electrode substrate is a transparent conductive substrate in which a transparent conductive layer (E) is placed on a gas barrier laminated film. The gas barrier laminated film has a gas barrier layer (X) and a hardened resin layer (U) on a transparent polymer substrate (S). And, the placing of the transparent conductive layer (E) is performed in such a manner that the transparent electrode (E) is in contact with the hardened resin layer (U). By using the transparent conductive substrate as the electrode substrate, a liquid crystal display component having high reliability which is resistant to the deterioration of display quality even when it is allowed to stand in a high-temperature and high-humidity environment for a long time is provided. This transparent conductive substrate is also included as one of the objects of the present invention. A typical example of such a transparent conductive substrate is shown in FIG. 2. In the transparent conductive substrate, a transparent conductive layer (E) 27, a hardened resin layer (U) 29, a transparent polymer substrate (S) 31, a hardened resin layer (B) 33, a gas barrier layer (X) 35 and a hardened resin layer (C) 37 are placed in such a manner that they are in contact with each other in this order.

Such a transparent conductive substrate has an all-over water absorption coefficient of 2% or less and a total light transmittance of 80% or more, that is, it is low in water absorption and excellent in transparency. The conductive substrate therefore can be suitably used naturally as an electrode substrate of a liquid crystal display component in which high reliability and a high gas barrier property are expected, and also in the field of a flat panel display field such as a photosensitive conductor, a surface light emitter, an EL-display or the like.

[Transparent polymer substrate (S)]

A material for a transparent polymer substrate (S) is not specifically limited as far as it is a transparent polymer having excellent transparency and heat resistance. Preferable examples of such a transparent polymer include a polyester resin, a polycarbonate resin, a polyarylate resin, a polysulfone resin such as polysulfone, polyether sulfone or polyarylsulfone, a polyolefin resin, an acetate resin such as cellulose triacetate, a polyacrylate resin, various kinds of thermosetting resins and the like. Especially, a film or a sheet mainly comprising a polycarbonate resin or a polyarylate resin is more preferable in that it has excellent transparency and heat resistance as mentioned above, and relatively low optical anisotropy. Further, the polycarbonate resin is especially suitable when it is formed by a solvent casting method since the obtained film or sheet is excellent in surface smoothness and in optical isotropy.

An example of the polycarbonate resin is a polycarbonate resin whose bisphenol component is a bisphenol expressed by the following formula [1]

[1]

e.g., 2,2-bis(4-hydroxyphenyl)propane Bisphenol A). Herein, $R^1$, $R^2$, $R^3$ and $R^4$ are same as or different from each other, and they are each a hydrogen atom or methyl group, and X is a cycloalkylene group having 5 to 10 carbon atoms, an aralkylene group having 7 to 15 carbon atoms or a haloalkylene group having 1 to 5 carbon atoms.

Concrete examples of the X, when it is a cycloalkylene group, include 1,1-cyclopentylene, 1,1-cyclohexylene, 1,1-(3,3,5-trimethyl)cyclohexylene, norbornane-2,2-diyl and tricyclo[5.2.1.0$^{2,6}$]decane-8,8'-diyl. Especially, 1,1-cyclohexylene and 1,1-(3,3,5-trimethyl)cyclohexylene are suitably used in that the raw materials are easily available. Further, concrete examples of the X, when it is an aralkylene group, include phenylmethylene, diphenylmethylene, 1,1-(1-phenyl)ethylene and 9,9-fluorenylene. Further, 2,2-hexafluoropropylene, 2,2-(1,1,3,3-tetrafluoro-1,3-dicyclo)propylene or the like is suitably used as the haloalkylene of the X. These compounds may be used singly or plurally. Among them, 1,1-(3,3,5-trimethyl)cyclohexylene and 9,9-fluorenylene are preferable from the point of view of heat resistance and optical properties required in a liquid crystal display component.

The above-mentioned bisphenol components may be used in the combination of two or more kinds.

Such a polycarbonate resin may be a copolymer or may be used in the combination of two or more kinds.

As such a polycarbonate resin, (i) a homopolymer whose bisphenol component is bisphenol A or (ii) a copolymer whose bisphenol components are bisphenol A and a bisphenol of the above formula [1], wherein the X is 1,1-(3,3,5-trimethyl)cyclohexylene or 9,9-fluorenylene, is further preferable. In the composition of such a copolymer, the content of bisphenol A is preferably 10 to 90 mol %.

The transparent polymer substrate (S) is preferably a film or a sheet having a thickness in the range of 0.01 to 1.0 mm. When the thickness is less than 0.01 mm, the stiffness is not sufficient, it is easily deformed on panel processing, and it is difficult in handling. On the other hand, when it is larger than 1.0 mm, it is resistant to deformation, but when such a liquid crystal display component has been assembled, a double-imaging trouble becomes extreme with the result that it deteriorates display quality. The preferred thickness is in the range of 0.02 to 0.7 mm.

The transparent conductive substrate preferably has the following excellent optical isotropy, transparency and non-water-absorption when used as an electrode substrate for a liquid crystal display panel:
(i) a retardation value is 30 nm or less (preferably, 20 nm or less),
(ii) a dispersion of the angle of a lagging phase axis is ±30 degree or less (preferably, ±15 degree or less),
(iii) a total light transmittance is 80% or more (preferably, 85% or more) and,
(iv) a water absorption coefficient is 2% or less preferably, 1% or less).

Herein, the retardation value is expressed by the product $\Delta n \cdot d$ of the difference $\Delta n$ of the refractive indexes in birefringence at a wave length of 590 nm determined by a known measuring instrument and the thickness d of the film.

A transparent polymer substrate having a low water absorption coefficient is preferred. When the water absorption coefficient is high, the substrate absorbs water at a high-temperature high-humidity test, the surface electric resistivity of the base of the transparent conductive layer is lowered, and resultingly the display defect of the panel is apt to occur. Such a trouble can be suppressed considerably by the lamination of a gas barrier layer shown below; however, in order to get higher high-temperature high-humidity reliability, it is preferable that the water absorption coefficient of the transparent polymer substrate is 0.7% or less.

[Gas barrier layer (X)]

When the above-mentioned transparent conductive substrate is used as an electrode substrate for a liquid crystal display component, it is important to laminate at least one layer of an organic or inorganic gas barrier layer (X) on at least one side of the above transparent polymer substrate. Examples of the organic gas barrier layer include a layer formed of a vinyl alcohol polymer such as polyvinyl alcohol or a vinyl alcohol-ethylene copolymer, an acrylonitrile polymer such as polyacrylonitrile, an acrylonitrile-methyl acrylate copolymer or an acrylonitrile-styrene copolymer or a polymer such as polyvinylidene chloride. The organic gas barrier layer can be commonly formed by applying a coating composition prepared by dissolving an above-mentioned polymer in an organic solvent on a transparent polymer substrate (S) by a coating method. As a method for the application, a known method, for example, a reverse roll coating method, a micro gravure coating method, a direct gravure coating method, a kiss-roll coating method or a die coating method can be used. The viscosity of a coating solution and the film thickness of a gas barrier layer can be controlled by diluting the coating composition with an appropriate organic solvent.

The thickness of the organic gas barrier layer may be controlled depending on the material to be used so that the water vapor transmission of the whole of the transparent conductive substrate after the removal of the transparent conductive layer from the transparent conductive substrate of the present invention becomes as little as possible in a high-temperature and high-humidity environment; however, usually it is preferably 1 to 50 μm.

Further, examples of the inorganic gas barrier layer include a metal oxide mainly of one or more kinds of metals selected from a group consisting of silicon, aluminum, magnesium, zinc, zirconium, titanium; yttrium and tantalum, a metal nitride of silicone, aluminum or boron, and a mixture of these compounds. Among these compounds, preferable one is a metal oxide consisting mainly of silicon oxide having the ratio of the number of oxygen atoms to the number of silicon atoms of 1.5 to 2.0 from view points of gas barrier property, transparency, surface smoothness, flexibility, membrane stress, cost and the like. The ratio of the number of oxygen atoms to the number of silicone atoms in the silicone oxide is analyzed and determined by X-ray photoelectric spectroscopy, X-ray micro spectroscopy, Auger electron spectroscopy, Rutherford's back scattering method or the like. When the ratio becomes smaller than 1.5, the transparency is lowered, and so it is preferably 1.5 to 2.0. Further, the compounding of magnesium oxide and/or magnesium fluoride in an amount of 5 to 30% by weight based on the total weight in the above-mentioned silicone oxide enables the increase of transparency. These inorganic gas barrier layers can be formed by a vapor deposition method which forms a film by depositing a material from a gas phase, for example, such as a sputter technique, a vacuum evaporation method, an ion plating method, a plasma CVD method or the like. Among these, the sputter technique is preferred in that especially excellent gas barrier property is obtained.

The film thickness of the inorganic gas barrier layer is preferably in the range of 2 nm to 1 μm. When the thickness of the metal oxide layer is less than 2 nm, it is difficult to form a homogeneous layer, and no layer parts are formed with the result that the gas permeability becomes large. On the other hand, when the thickness is larger than 1 μm, not only the transparency becomes poor, but also when the transparent conductive substrate is bent, cracks are generated in the gas barrier layer, and the gas permeability is increased. Especially, as mentioned later, when the X is interleaved in a sandwiched state with hardened resin layers (B) and (C) consisting of (P) or (Q), a high gas-barrier property can be obtained even in cases where the X is made thin to 5 to 200 nm, further 5 to 50 nm.

According to the present invention, in a transparent conductive substrate, when the hardened resin layer (B) having a water absorption coefficient larger than that of the transparent polymer substrate (S) is laminated on the surface of the (S) of the opposite side to the surface on which a hardened resin layer (U) is laminated, it is possible to obtain a panel which is further resistant to the deterioration of displaying quality even in the case where it is allowed to stand for a long time in a high-temperature and high-humidity environment. Herein, as the said layer (B), a silicon-containing resin such as the (P) or (Q) which will be described later, a thermosetting resin such as an epoxy resin, a radiation curing resin such as an ultraviolet-curing acrylic resin, a melamine resin, a urethane resin, an alkyd resin, or the like can be cited.

Further, in order to achieve an extremely high gas barrier property which is required to a liquid crystal display component, it is preferable that a metal oxide consisting mainly of the above-mentioned silicon oxide is used as the gas barrier layer (X), and a hardened resin layer (B) consisting of a silicon-containing resin and a hardened resin layer (C) consisting of a silicone-containing resin are placed in such a manner that they come into contact with the (X) by sandwiching it. As the silicon-containing resin, a vinyl alcohol-containing polysiloxane resin (P) or an organic polysiloxane resin (Q) is preferable, and it is more preferable that at least one out of hardened resin layers (B) and (C) is the (P). By constructing a layer in this manner, even in the case of using a metal oxide layer mainly consisting of silicone oxide layer having a thin film thickness, the gas transmission of the whole of the substrate can be reduced, and especially, a water vapor transmission can be reduced below 0.1 g/m²/day.

The vinyl alcohol-containing polysiloxane resin (P) can be obtained by using a coating composition containing a vinyl alcohol polymer, an epoxy group-containing silicone compound and an amino group-containing silicon compound.

Herein, the vinyl alcohol polymer means a vinyl alcohol copolymer containing not less than 50 mol % vinyl alcohol or a homopolymer of vinyl alcohol. Examples of the vinyl alcohol copolymer include a vinyl alcohol-vinyl acetate copolymer, a vinyl alcohol-vinyl butyrate copolymer, an ethylene-vinyl alcohol copolymer or a polyvinyl alcohol having a silyl group in a molecule. Especially, when an ethylene-vinyl alcohol copolymer is used, a vinyl alcohol-containing polysiloxane resin (P) having excellent chemical resistance, water resistance and durability can be obtained.

The vinyl alcohol polymer is used as a coating composition by dissolving it in a solvent such as water, an alcohol or dimethylimidazoline. For example, an ethylene-vinyl alcohol copolymer is preferably used as a component of a coating composition by dissolving it in a mixed solvent composed mainly of water and propanol.

The epoxy group-containing silicon compound is selected from a group consisting of a silicon compound having an epoxy group and an alkoxysilyl group, its (partial) hydrolyzate, its (partial) condensate and their mixture, and it is expressed, for example, by the following formula [II]

$$X-R^{11}-Si(R^{12})_n(OR^{13})_{3-n} \quad [II]$$

Herein, $R^{11}$ is an alkylene group having 1 to 4 carbon atoms, $R^{12}$ and $R^{13}$ are each an alkyl group having 1 to 4 carbon atoms, X is a glycidoxy group or an epoxycyclohexyl group, and n is 0 or 1.

An especially preferable epoxy group-containing silicone compound is 3-glycidoxypropyltrimethoxysilane, 2-(3,4-epoxycyclohexyl)ethyltrimethoxysilane. These compounds may be used singly or in the combination of two or more kinds.

The amino group-containing silicon compound is selected from a group consisting of a silicon compound containing an amino group and an alkoxysilyl group, its (partial) hydrolyzate, its (partial) condensate and their mixture, and it is expressed, for example, by the following formula [III].

$$Y\text{—}HN\text{—}R^{14}\text{—}Si(R^{15})_m(OR^{16})_{3-m} \qquad [III]$$

Herein, $R^{14}$ is an alkylene group having 1 to 4 carbon atoms, $R^{15}$ and $R^{16}$ are each an alkyl group having 1 to 4 carbon atoms, Y is a hydrogen atom or an aminoalkyl group, and m is 0 or 1.

Among them, an especially preferable amino group-containing silicone compound is 3-aminopropyltrimethoxysilane, 3-aminopropyltriethoxysilane, N-methyl-3-aminopropyltrimethoxysilane, 3-aminopropylmethyldiethoxysilane, N-(2-aaminoethyl)-3-aminopropyltrimethoxysilane and N-(2-aminoethyl)-3-aminopropylmethyldimethoxysilane. These compounds may be used singly or in the combination of two or more kinds.

Further, a (partial) hydrolyzate or a (partial) condensate of an epoxy group-containing silicon compound or an amino group-containing silicon compound is a product of a partial or total hydrolysis of the above-mentioned epoxy group-containing silicon compound or amino group-containing silicon compound, a product of the condensation of a part or the whole of the hydrolyzate with itself, or a product of the condensation of the condensate with the epoxy group-containing silicon compound or the amino group-containing silicon compound which has not been hydrolyzed, i.e. the raw material. These products can be obtained by a so-called sol-gel reaction. Herein, the hydrolysate is obtained, for example, by mixing the raw material with an acidic aqueous-solution of an inorganic acid such as hydrochloric acid or an organic acid such as acetic acid, or water. Further, the coating solution is preferably diluted with an organic solvent selected from various of an alcohol, an ester, an ether, a ketone, a cellosolve and the like in consideration of storage stability and coating stability.

When the compounding ratio of the epoxy group-containing silicone compound to the amino group-containing silicone compound is expressed by the ratio of the amount Ep of the epoxy-group in terms of molar equivalent to the amount Ap of the amino-group in terms of molar equivalent, it is preferably in the range of 1/6<Ep/Ap<6/1. When the compounding ratio is out of the range, adhesiveness, heat resistance, solvent resistance, water resistance and durability become poor. The mixing of a mixture of such an epoxy group-containing silicon compound and an amino group-containing silicone compound with a polyvinyl alcohol polymer is carried out in such a manner that the compounding ratio becomes not less than 20% by weight and not more than 95% by weight after hardening. When it is less than 20% by weight, the water resistance and chemical resistance are apt to become poor, and when more than 95% by weight, the gas barrier property is apt to decrease. Herein, the weight of the mixture of the epoxy group-containing silicon compound and the amino group-containing silicon compound after hardening is based on the weight expressed by $X\text{—}R^{11}\text{—}Si(R^{12})_nO_{(3-n)/2}$ and $Y\text{—}HN\text{—}R^{14}\text{—}Si(R^{15})_mO_{(3-m)/2}$. These weight conversion equations are defined as above, assuming that all of the alkoxyl groups in each silicon compound have been hydrolyzed and condensed.

Especially, by laminating the polyvinyl alcohol-containing polysiloxane resin on at least one side of a gas barrier layer consisting of a metal oxide mainly composed of said silicone oxide in a state coming in contact with it, a gas barrier property is further improved.

In the above-mentioned coating composition, an organic solvent, a catalyst such as acetic acid, a stabilizer and a leveling agent are optionally contained besides the vinyl alcohol polymer, the epoxy group-containing polymer and the amino group-containing polymer. Regarding the concentration of acetic acid in said composition, the acetic acid is preferably added in the range of 0.2 to 5 molar equivalents per molar concentration of the amino group and/or imino group in the coating composition. Further, the amounts of the organic solvent, stabilizer and leveling agent may be controlled considering workability and/or the film thickness of the hardened resin layer to be obtained.

The (P) can be obtained by applying the composition on a base material such as the (S) and subjecting it to hardening reaction under heating or the like. The heating is carried out usually at a temperature in the range from room temperature to the glass transition temperature of the (S). By this heating, the so-called sol-gel reaction of the epoxy group-containing silicon compound and the amino group-containing silicon compound proceeds, and as a result, a part or all of the vinyl alcohol polymer is made to react to obtain a hardened resin layer.

The thickness of the layer of the polyvinyl alcohol-containing polysiloxane resin (P) can be properly selected from the range roughly of 0.01 to 20 μm.

The organic polysiloxane resin (Q) can be obtained by using a coating composition composed of an epoxy group-containing silicon compound and an amino group-containing silicon compound.

As the above-mentioned organic polysiloxane resin (Q), an organic silicon compound expressed by the following formula (IV) or the product obtained by subjecting its hydrolysate to so-called sol-gel reaction is preferred.

$$R^{17}_aR^{18}_bSiX_{4-a-b} \qquad (IV)$$

Herein, $R^{17}$ is an organic group having 1 to 10 carbon atoms, $R^{18}$ is a hydrocarbon group having 1 to 6 carbon atoms or a halogenated hydrocarbon group, X is a hydrolyzing group, a and b are each 0 or 1. Examples of the organic silicon compound expressed by the above-mentioned formula (IV) include tetramethoxysilane, tetraethoxysilane, methyltrimethoxysilane, methyltriethoxysilane, ethyltrimethoxysilane, vinyltrimethoxysilane, vinyltriethoxysilane, 3-methacryloxypropyltrimethoxysilane, 3-mercaptopropyltrimethoxysilane, dimethyldimethoxysilane, 3-glycidoxypropyltrimethoxysilane, 3-glycidoxypropyltriethoxysilane, (3,4-epoxycyclohexyl) ethyltrimethoxysilane, (3,4-epoxycyclohexyl) ethyltriethoxysilane, aminomethyltriethoxysilane, 3-aminopropyltrimethoxysilane, 3-aminopropyltriethoxysilane, N-aminomethyl-3-aminopropyltrimethoxysilane, N-(2-aminoethyl)-3-aminopropyltrimethoxysilane, N-(2-aminoethyl)-3-aminopropyltriethoxysilane, N-methylaminopropyltrimetloxysilane, 3-aminopropylmethyldiethoxysilane, N-(2-aminoethyl)-3-aminopropylmethyldimethoxysilane and the like. These compounds can be used singly or in the combination of two or more kinds. Especially, it is preferable to use a mixture composed mainly of an epoxy group-containing silicon compound of the above formula (II) and an amino group-containing silicone compound of the above formula (III). Here, when the compounding ratio of the epoxy group-containing silicone compound to the amino group-containing silicone compound is expressed by the ratio of the amount Eq of the epoxy-group in terms of molar equivalent to the amount Aq of the amino-group in terms of molar equivalent, it is preferable to use the compounds in the range of 5/95<Eq/Aq<95/5, from the points of view of chemical resistance and interlayer adhesivity. Especially, the formation of a gas barrier layer consisting of a metal oxide composed mainly of the above-mentioned silicon oxide on said organic polysiloxane resin layer further improves the gas barrier property.

The organic polysiloxane resin (Q) can be produced by the same method as for the above-mentioned (P).

The film thickness of the organic polysiloxane resin (Q) can be properly selected from the range roughly of 0.01 to 20 μm.

[Hardened resin layer (U)]

The hardened resin layer (U) is used by laminating a transparent conductive layer (E) on it. The (U) has a surface electric resistivity of $1.0 \times 10^{13}$ Ω/□ or more in an environment of 50° C. and 30% RH and that of $1.0 \times 10^{12}$ Ω/□ or more in an environment of 50° C. and 90% RH, and it can provide a liquid crystal display component which is free from a display defect in a liquid crystal panel for a long time, and has high stability and reliability. When a liquid crystal panel is produced by using a transparent conductive substrate having a surface electric resistivity of less than $1.0 \times 10^{12}$ Ω/□ in an environment of 50° C. and 90% RH, display defects such as image bleeding or cross talk in an image are apt to occur on a high-temperature high-humidity durability test of the panel.

In said hardened resin layer (U), it is preferable to suppress polar groups, water absorption and ionic impurities as low as possible. The more the content of the polar groups such as a hydroxyl group, an amimo group, an amide group or a carbonyl group, the higher the absorption and the more the contamination of ionic impurities are, the more extreme the decreasing of surface electric resistivity is. However, unless the polar groups exist in some degree, the interlayer close adhesion of transparent conductive substrates can not be secured. The water absorption varies depending on the structure of a hardened resin layer and the layer forming conditions, and a highly cross-linked layer is preferable. From the point of view of productivity, a thermosetting resin which can obtain sufficient objective properties with a short heat treatment is more preferred. Further, the contamination of ionic impurities or the like must be suppressed as low as possible, of course, in the purification of the raw material of the hardened resin layer (U) but also in the manufacturing process of the transparent conductive substrate. Further, for a liquid crystal panel which performs displaying by high frequency driving, it is preferable to suppress the permittivity of the hardened resin layer (U) to the lowest possible level.

Such a hardened resin layer (U) is required to have chemical resistance, transparency and excellent interlayer adhesivity, and examples of the hardened resin layer (U) include thermosetting resins such as a. silicon-containing resin, an epoxy resin, a melamine resin, a urethane resin and an alkyd resin, and a radiation curing resin such as an ultraviolet-ray curing acrylic resin.

In the present invention, when the hardened resin layer (U) comprises a silicone-containing resin satisfying the following equations (1), (2) and (3), the insulation resistance of the surface of the (U) after the removal of a transparent electrode layer by etching or the like is extremely high in a high-temperature and high-humidity environment. Therefore, when the transparent conductive substrate is used as an electrode substrate, in a circuit pattern prepared by etching or the like, even in the case where the distance between adjacent electrodes in the substrate plane is short, sufficient insulation can be secured. This enables the obtaining of a liquid crystal display component having high reliability against a high-temperature and high-humidity environment, and having high minuteness.

$$0.01 < (a)/(b) < 1.0 \quad (1)$$

$$0.01 < (c)/(b) < 0.5 \quad (2)$$

$$0.01 < (d)/(b) < 2.0 \quad (3)$$

Herein, (a) is the absorbance of absorption based on an O—H stretching vibration having the peak near 3500 cm$^{-1}$, (b) is the absorbance of absorption based on a C—H stretching vibration having the peak near 3000 cm$^{-1}$, (c) is the absorbance of absorption based on an —NH$_2$ in-plain deformation vibration having the peak near 1600 cm$^{-1}$ and (d) is the absorbance attributable to an Si—O having the peak near 1130 cm$^{-1}$, in infrared absorption spectrum.

Further, in the absorbance (b) attributable to C—H stretching vibration, when stretching vibrations of identical bonds are adjacent to each other, two absorptions of symmetry and asymmetry are observed; and the C—H stretching vibration having the largest absorbance is taken as the (b). In addition, the hardened resin (U) is excellent in the adhesivity to the transparent conductive layer besides the above-mentioned properties. Resultingly, it has excellent resistance against chemicals such as an acid, an alkali and NMP, which are needed in the manufacturing process for liquid crystal display panel. When the above equations (1), (2) and (3) are not satisfied, these excellent properties are difficult to be obtained concurrently.

Preferable examples of such a silicon-containing resin include the above-mentioned polyvinyl alcohol-containing polysiloxane resin (P) and organic polysiloxane resin (Q). In the case of the polysiloxane resin (P), the compounding ratio of the epoxy group-containing silicon compound to the amino group-containing silicon compound is controlled in the range of 50/50 <UEp/UAp<95/5, wherein UEp is the amount of the epoxy group in terms of molar equivalent, and UAp is the amount of the amino group in terms of molar equivalent, and when a mixture of the epoxy group-containing silicon compound and the amino group-containing silicon compound is mixed with a polyvinyl alcohol polymer, it is preferable to mix so that the compounding ratio becomes 50% by weight or more in terms of the weight ration of the solid component after hardening. On the other hand, in the case of the organic polysiloxane resin (Q), it is further preferable to mix so that the compounding ratio of an epoxy group-containing alkoxysilane to an amino group-containing alkoxysilane is in the range of 50/50≦UEq/UAq≦95/5, wherein UEq is the amount of the epoxy group in terms of molar equivalent, and UAq is the amount of the amino group in terms of molar equivalent. Especially preferable range is 65/35≦UEq/UAq≦85/15.

The epoxy resin is preferably an epoxy resin of a novolac type from the point of view of solvent resistance. As a hardener for hardening such an epoxy resin, a known hardener can be used. For example, a hardener of an amine, a polyaminoamide, an acid or acid anhydride, an imidazole, a mercaptan, a phenol resin or the like can be used. Especially, an acid anhydride, an acid anhydride structure-containing polymer or an aliphatic amine is preferably used from the point of view of solvent resistance, optical property, thermal property and the like. Further preferably, an acid anhydride and an acid anhydride structure-containing polymer are used. Furthermore, in order to increase reaction speed, an adequate amount of a hardening catalyst of a known tertiary amine, imidazole or the like is preferably added.

The radiation curing resin is a resin in which hardening proceeds by the irradiation of radial rays such as ultraviolet rays, electron beams or the like, and concretely it is a resin containing an unsaturated double bond such as an acryloyl group, methacryloyl group or vinyl group in the molecule or the monomer structure. Among them, an acrylic resin containing acryloyl groups is preferable from the point of view of reactivity. The radiation curing resin may be used singly or in a mixture of plural kinds of such resins; however, it is preferable to use an acrylic resin having two or more acryloyl groups in the molecule or the unit structure from the point of view of solvent resistance. Examples of the polyfunctional acrylate resin include a urethane acrylate, an ester acrylate, an epoxy acrylate or the like, but it is not restricted to these compounds. Especially, an acrylic resin which contains the units of the following formulae (V) and/or (VI), and has at least two acryloyl groups is preferable in that the surface insulation resistance in a high-temperature and high-humidity environment is increased.

(V)

(VI)

Such an epoxy resin and a radiation curing resin may be each compounded with a known hydrolysate of an alkoxysilane or silane coupling agent in order to impart further adhesivity and solvent resistance. In cases where an ultraviolet ray hardening method is applied, the above-mentioned radiation curing resin is usually compounded with an adequate amount of a known optical reaction initiator.

The film thickness of the above-mentioned resin layer (U) can be adequately selected from the range roughly of 0.01 to 20 μm, preferably 0.03 to 10 μm.

The above-mentioned hardened resin layer (U) can be manufactured by a conventional method comprising the application of a composition prepared by mixing a hardening resin in an organic solvent on a base material followed by the heating or ultraviolet irradiation to harden the resin. Especially, when the (P) and (Q) are used as the silicon-containing resin, the layer (U) can be formed by the above-mentioned method.

[Gas barrier laminated film]

The present invention gives a transparent conductive substrate having the above-mentioned excellent properties and excellent gas barrier property by placing the transparent conductive layer (E) in such a manner that it is in contact with the hardened resin layer (U) of a gas barrier laminated film comprising the above-mentioned transparent polymer substrate (S), gas barrier layer (X) and hardened resin layer (U). That is, the laminated film has a high value of surface electric resistivity in the layer (U) even in a high-temperature and high-humidity environment, and at the same time the laminated film is excellent in a gas barrier property and has a water absorption coefficient of 2% or less.

Especially, the laminated film has a water vapor transmission of 1 g/m²/day or less, preferably 0.1 g/m²/day or less in an environment of 40° C. and 90% RH, and further, the surface of the (U) exhibits a high insulation resistance in a high-temperature and high-humidity environment.

[Transparent conductive layer (E)]

As the transparent conductive layer (E), a known metal layer, metal oxide layer or the like can be used; however, the metal oxide layer is especially preferable from the points of view of transparency, conductivity and mechanical properties. Examples of the transparent conductive layer (E) include metal oxide layers of indium oxide, cadmium oxide and tin oxide to which tin, tellurium, cadmium, molybdenum, tungsten, fluorine, zinc, germanium or the like is added as an impurity, and zinc oxide, titanium oxide and the like to which aluminum is added as an impurity. Among them, a thin film of an indium oxide containing 2 to 15% by weight tin oxide as an impurity or a thin film of an indium oxide containing 2 to 15% by weight zinc oxide as an impurity is preferable since it is excellent in transparency and conductivity.

The film thickness of the above-mentioned transparent conductive layer (E) is determined depending the objective surface electric resistivity, but it is 1 nm to 1 μm, preferably 10 nm to 500 nm.

In the present invention, when the (P) add (Q) are used as the hardened resin layers (B) and (C), the transparent conductive substrate prepared by laminating layers in the following order is preferable, for example, (E)/(U)/(S)/(X),
(E)/(U)/(X)/(S)/(X),
(E)/(U)/(S)/(P)/(X)/(Q),
(E)/(U)/(S)/(Q)/(X)/(P),
(E)/(U)/(S)/(P)/(X)/(P),
(E)/(U)/(P)/(X)/(Q)/(S)/(P)/(X)/(Q),
(E)/(U)/(P)/(X)/(Q)/(S)/(Q)/(X)/(P),
(E)/(U)/(P)/(X)/(Q)/(S)/(P)/(X)/(P),
(E)/(U)/(Q)/(X)/(P)/(S)/(P)/(X)/(Q),
(E)/(U)/(Q)/(X)/(P)/(S)/(Q)/(X)/(P),
(E)/(U)/(Q)/(X)/(P)/(S)/(P)/(X)/(P),
(E)/(U)/(P)/(X)/(P)/(S)/(P)/(X)/(Q),
(E)/(U)/(P)/(X)/(P)/(S)/(Q)/(X)/(P) and
(E)/(U)/(P)/(X)/(P)/(S)/(P)/(X)/(P), Especially, a liquid crystal display component prepared by using a transparent conductive substrate having the following structure is resistant to the display deterioration even after long standing in a high-temperature and high-humidity environment, in spite that only one gas barrier layer (X) is laminated.

(E)/(U)/(S)/(P)/(X)/(Q),
(E)/(U)/(S)/(Q)/(X)/(P) and
(E)/(U)/(S)/(P)/(X)/(P),

Further, this transparent conductive substrate preferably has the following features: excellent patterning property of electrodes and lamination property of alignment layer in the process of assembling of a liquid crystal display component; excellent chemical resistance against various kinds of organic solvents, acids and alkalis in various cleaning processes; and excellent interlayer adhesion.

Further, various kinds of chemical treatments, or physical treatments such as corona treatment, plasma treatment or UV-irradiation on the lamination or the like of undercoat layers for intensifying each interlayer adhesion can be performed as long as the effect of the present invention is not lowered. Especially, when a hardened resin layer (A) is placed between the (U) and (S) as an anchor layer, the adhesivity preferably further increases. For the hardened resin layer (A), a urethane resin is preferable.

When the transparent conductive substrate of the present invention is handled in a film roll state, it is efficient to place a slipperiness-imparting layer on the opposite side to the side where a transparent conductive layer is laminated or to subject that side to a knurling treatment.

Further, a color filter layer can be formed optionally on the transparent conductive layer of the present invention, for example, with the object of imparting a color display function to the liquid crystal display component produced by using the substrate. The color filter can be formed by a known technology such as a dyeing method, a pigment dispersion method, an electrodeposition technique or a printing method. It is preferable that the color filter layer is formed at an interlayer space other than that between the transparent conductive layer (E) and the hardened resin layer (U) of a transparent conductive substrate or on the outermost side which is opposite to the side where the transparent conductive layer (E) is laminated since this makes easy to secure the motional reliability of the liquid crystal panel to be formed.

EFFECT OF THE INVENTION

The transparent conductive substrate of the present invention has excellent transparency, optical isotropy, chemical resistance, interlayer adhesivity and gas barrier properties, and it is extremely useful as a transparent conductive substrate which can give a liquid crystal panel resistant to the occurrence of the deterioration of display quality even after long standing in a high-temperature and high-humidity environment.

EXAMPLE

The present invention will be explained further in detail hereafter with examples, while the present invention is not restricted by the examples. In the examples, part and percent are expressed by weight unless otherwise specified. Further, in the examples, each measuring is carried out as shown below.

Surface electric resistivity: After the whole transparent conductive layer of a transparent conductive substrate was completely removed by etching, the surface electric resistivity of a hardened resin layer (U) which was the under layer of the transparent conductive layer in the transparent conductive substrate was measured. R30, a surface electric resistivity at 50° C. and 30% RH and R90, a surface electric resistivity at 50° C. and 90% RH were measured by using a 8009-type or 6517A-type resistivity test fixture manufactured by Keithley. The etching was performed by using a 10% hydrochloric acid aqueous solution.

Water vapor barrier property: A water vapor transmission in an atmosphere of 40° C. and 90% RH was measured by using permatran W1A manufactured by Mocon Company.

Water absorption coefficient: Water absorption coefficients of a transparent polymer substrate (S), the whole of a transparent conductive substrate and a hardened resin layer (B) were each measured according to ASTM D570.

Infrared absorption spectrum: A hardened resin layer (B) which was the under layer of a transparent conductive layer (E) was shaved out from the surface of a sample prepared by completely removing the transparent conductive layer (E) of a transparent conductive substrate by etching. This sample was dried for 1 hr under the condition of 60° C. DRY with the purpose of removing the absorbed water, and subsequently the infrared absorption spectrum was measure by a KBr method. The measuring sample was prepared by mixing the above-obtained sample with KBr at a ratio of 0.3 part to 100 pats by weight. As a measuring instrument, an FT-IR manufactured by Perkin-Elmer Corporation was used. The absorbance (a) of absorption assigned to an O—H stretching vibration having a peak near 3500 $cm^{-1}$, the absorbance (b) of absorption assigned to a C—H stretching vibration having a peak near 3000 $cm^{-1}$, the absorbance (c) of absorption assigned to an —$NH_2$ in-plain deformation vibration having a peak near 1600 $cm^{-1}$ and the absorbance (d) of absorption attributable to an Si—O having a peak near 1100 $cm^{-1}$ were measure.

Transparency: The light transmittance of parallel light having a wave length of 550 nm was measured by using an ordinary spectrophotometer.

Optical isotropy: The retardation value against the light having a wave length of 590 nm was measured by using a multi-wavelength refractometer M-150 manufactured by Nippon Bunko.

Interlayer adhesivity: The interlayer adhesive strengths of the layers constituting a transparent conductive substrate were each evaluated according to ASTM D2196-68.

Reliability of liquid crystal panel: A liquid crystal display component shown in FIG. 1 was prepared and the reliability was evaluated on the component. The liquid crystal display component has the following structure: an upper side laminated film having a gas barrier property (hereafter, a gas barrier laminated film is referred to as a laminated film) 11 and the lower laminated film 13 are placed at positions facing each other, and the edge parts of the laminated films 11 and 13 are sealed with a sealing material 15 and pieces of a gapping material 21 are dispersed to form a liquid crystal cell 17; a liquid crystal material 19 is enclosed in the liquid crystal cell 17; polarizing plates are placed in such a manner that the liquid crystal cell 17 is held between them to constitute an STN-type liquid crystal display component; on the upper laminated film 11, a transparent conductive layer 23 which has been subjected to a patterning treatment is placed to constitute a transparent conductive substrate of the present invention; on the lower laminated film 13, a transparent conductive layer 23 which has not been subjected to a patterning treatment is placed to constitute a transparent conductive substrate of the present invention; and on the inner side face of each laminated film, an alignment layer 25 is formed.

In a transparent conductive substrate, a display electrode for 160×100 dots was formed on the transparent conductive layer by photolithography. Subsequently, on the surface of the electrode, an alignment layer 1000 Å thick was formed, and the alignment layer was subjected to a rubbing treatment so that the twist angle becomes 220°. Then, plastic beads of 6.5 μm in diameter as a gapping agent were dispersed on the inside surface of the electrode surface in such a manner that the dispersion density became 150 piece/$mm^2$, and two sheets of the transparent conductive substrates were stuck together with an epoxy adhesive in such a manner that the electrode surfaces were placed inwardly to form a cell. Subsequently, a nematic liquid crystal containing chiral nematic liquid crystal was infused into the cell from an inlet, and the inlet was sealed after the cell gap was leveled by a pressuring method. Finally, polarizing plates were laminated on both the sides of the cell to obtain a liquid crystal panel. Thus obtained liquid crystal panel was allowed to stand in an environment of 50° C. and 90% RH for 250 hr, and the decrease of impedance of the liquid cell was examined.

Further, the below-mentioned compounds were expressed by the following codes.

BisA-PC: A polycarbonate having 2,2-bis(4-hydroxyphenyl)propane (bisphenol A; BisA) as the bisphenol component.

BisA/BCF-PC: A polycarbonate copolymer having bisphenol A and 9,9-bis(4-hydroxy-3-methylphenyl) fluorene (BCF) as the bisphenol components.

BisA/IP-PC: A polycarbonate copolymer having bisphenol A and 3,3,5-trimethyl- 1,1-di(4-phenol) cyclohexylidene (IP) as the bisphenol components.

PES: Polyether sulfone.

ITO: Indium tin oxide.

ECHETMOS: 2-(3,4-Epoxycyclohexyl) ethyltrimethoxysilane.

APTMOS: 3-Aminopropyltrimethoxysilane.

EVOH: Ethylene-vinyl alcohol copolymer (Eval manufactured by Kurarey Co., Ltd.).

DCPA: Dimethyloltricyclodecanediacrylate (Light acrylate DCP-A manufactured by Kyoei Kagaku Co., Ltd.).

EA: Epoxy acrylate (Ripoxy R800 system manufactured by Showa Highpolymer Co., Ltd.).

UA: Urethane acrylate (NK oligo U-15HA manufactured by Shin Nakamura Kagaku Co., Ltd.).

PhR: A phenoxy resin (PAPHEN manufactured by Phenoxy Associates).

PI: Polyisocyanate (Koroneto manufactured by Nippon Poriuretan Kogyo Co., Ltd.).

Example 1

A polycarbonate (BisA-PC) having the bisphenol component consisting only of BisA and having an average molecular weight of 37,000 and Tg of 155° C. was dissolved in methylene chloride in such a manner as to become 20% by weight. This solution was cast on a polyester film 175 $\mu$m thick by a die coating method. Subsequently, the coated film was dried in a drying furnace until the remaining solvent concentration became 13% by weight, and the polycarbonate film was peeled from the polyester film. The obtained polycarbonate film was dried in a drying furnace of 120° C. until the remaining solvent concentration in the film became 0.08% by weight under holding the balance between longitudinal and lateral tensions.

Thus-obtained transparent polymer substrate (S) has a thickness of 100 $\mu$m and a light transmittance of 91% at a wave-length of 550 nm.

Subsequently, a coating composition for forming a polyvinyl alcohol-containing polysiloxane resin layer (P) was prepared as follows.

The component (P1) EVOH in an amount of 100 parts was dissolved under heating in a mixed solvent of 720 parts of water and 1080 parts of n-propanol to obtain a homogeneous solution. After the addition of 0.1 part of a leveling agent (SH30PA manufacture by Toray Dow Corning Co., Ltd.) and 39 parts of acetic acid to the solution, 211 parts of the component P2) ECHETMOS was added, and the mixture was stirred for 10 min. Further, 77 parts of the component (P3) APTMOS was added to the obtained solution, and the mixture was stirred for 3 hr to obtain the objective coating composition.

The compounding ratio of the coating composition was controlled so that it satisfied the following equations: (P1)/[(P2)+(P3)]=1/2 (after hardening) and (P2)/(P3)=2/1. This coating composition was applied on one side of the above-mentioned transparent polymer substrate (S), then the coated substrate was subjected to a thermal treatment at 130° C. for 3 min to form a layer (P) of 0.05 $\mu$m in thickness.

Subsequently, a gas barrier layer (X) consisting of an $SiO_2$ layer of 250 Å in thickness was laminated on a layer (B) by a DC magnetron sputtering method.

Further, a coating composition for giving a polysiloxane resin (Q) was prepared as followed.

To a mixed solvent of 720 parts by weight of water and 1080 parts by weight of 2-propanol was added 88 parts by weight of acetic acid, and subsequently 640 parts by weight of (Q1) ECHETMOS and 154 parts by weight of (Q2) APTMOS were each serially added and heated for 3 hr to obtain a coating composition. The compounding ratio of the coating composition satisfied the equation: (Q1)/(Q2)=3/1. The coating composition was applied on both the sides of the film on which (P) and (X) were laminated, and the film was subjected to a heating treatment at 130° C. for 3 min to form a layer (Q) of 2 $\mu$m in thickness.

Subsequently, a transparent conductive layer (E) consisting of an ITO layer of 130 nm in thickness was formed on the surface of the opposite side to the (X)-laminated face of the film by a DC magnetron sputtering method, and as the result, a transparent conductive substrate was obtained. The evaluation results of the obtained transparent conductive substrate i;were good as shown in Table 1.

Further, a liquid crystal display component prepared by using the transparent conductive substrate of the present invention showed completely no visual observation defect such as orientation deterioration in a high-temperature preservation test at 80° C. for 1000 hr, and the increase of power consumption was within 20% of the initial value; and high reliability was exhibited.

Example 2

Except that the construction of the substrate was (E)/(U)/(S)/(Q)/(X)/(P), a transparent conductive substrate was obtained in the same manner as in Example 1. The evaluation results of the obtained transparent conductive substrate were good as shown in Table 1.

Example 3

Except that the construction of the substrate was (E)/(U)/(S)/(P)/(X)/(P), a transparent conductive substrate was obtained in the same manner as in Example 1. The evaluation results of the obtained transparent conductive substrate were good as shown in Table 1.

Example 4

Except that a transparent polymer substrate (S) 150 $\mu$m thick consisting of a polycarbonate copolymer (BisA/BCF-PC) of BisA/BCF=1/1 (molar ratio) and of 225° C. in Tg was used, a transparent conductive substrate was obtained in the same manner as in Example 2. The evaluation results of the obtained transparent conductive substrate were good as shown in Table 1.

TABLE 1

|  |  | Example 1 | Example 2 | Example 3 | Example 4 |
|---|---|---|---|---|---|
| Substrate Construction | | E/U/S/B/X/C | E/U/S/B/X/C | E/U/S/B/X/C | E/U/S/B/X/C |
| S-substrate | composition | BisA-PC | BisA-PC | BisA-PC | BisA/BCF-PC (1/1) |
| | film thickness (μm) | 100 | 100 | 100 | 150 |
| E-layer | composition | ITO | ITO | ITO | ITO |
| | film thickness (μm) | 1300 | 1300 | 1300 | 1300 |
| X-layer | composition | $SiO_2$ | $SiO_2$ | $SiO_2$ | $SiO_2$ |
| | film thickness (μm) | 250 | 250 | 250 | 250 |
| B-layer | composition | P | Q | P | Q |
| | (B1) PVA polymer | EVOH | — | EVOH | — |
| | (B2) epoxy silane | ECHETMOS | ECHETMOS | ECHETMOS | ECHETMOS |
| | (B3) amino silane | APTMOS | APTMOS | APTMOS | APTMOS |
| | (B1)/[(B2) + (B3)] | 1/2 | 0/1 | 1/2 | 0/1 |
| | (B2)/(B3) | 2/1 | 3/1 | 2/1 | 3/1 |
| | film thickness (μm) | 0.05 | 0.05 | 0.05 | 0.05 |
| C-layer | composition | Q | P | P | P |
| | (C1) PVA polymer | — | EVOH | EVOH | EVOH |
| | (C2) epoxy silane | ECHETMOS | ECHETMOS | ECHETMOS | ECHETMOS |
| | (C3) amino silane | APTMOS | APTMOS | APTMOS | APTMOS |
| | (C1)/[(C2) + (C3)] | 0/1 | 1/2 | 1/2 | 1/2 |
| | (C2)/(C3) | 3/1 | 2/1 | 2/1 | 2/1 |
| | film thickness (μm) | 2 | 2 | 2 | 2 |
| U-layer | composition | Q (same as C-layer in Example 1) | Q (same as C-layer in Example 1) | Q (same as C-layer in Example 1) | Q (same as C-layer in Example 1) |
| | film thickness (μm) | 2 | 2 | 2 | 2 |
| Surface electric resistivity of U-layer ($\Omega/\square$) | 50° C. 30% RH | $2 \times 10^{15}$ | $2 \times 10^{15}$ | $2 \times 10^{15}$ | $2 \times 10^{15}$ |
| | 50° C. 90% RH | $2 \times 10^{13}$ | $2 \times 10^{13}$ | $2 \times 10^{13}$ | $2 \times 10^{13}$ |
| Water vapor transmission (g/m²/day) | | <0.1 | <0.1 | <0.1 | <0.1 |
| Water absorption coefficient (%) | transparent conductive substrate | <1 | <1 | <1 | <1 |
| | S-substrate | 0.25 | 0.25 | 0.25 | 0.25 |
| | B-layer | 4 | 2 | 4 | 2 |
| IR spectrum of U-layer ($cm^{-1}/cm^{-1}$) | (a)/(b) | 0.55 | 0.55 | 0.55 | 0.55 |
| | (c)/(b) | 0.13 | 0.13 | 0.13 | 0.13 |
| | (d)/(b) | 1.4 | 1.4 | 1.4 | 1.4 |
| Total light transmittance (%) | | 86 | 86 | 86 | 86 |
| Retardation (nm) | | 8 | 8 | 8 | 7 |
| Interlayer adhesivity[cross cut test] | | no peeling | no peeling | no peeling | no peeling |
| Liquid crystal panel reliability [cell impedance] | | almost no change | almost no change | almost no change | almost no change |

Example 5

Except that a transparent polymer substrate (S) 200 μm thick consisting of a polycarbonate copolymer (BisA/IP-PC) of BisA/IP=2/3 (molar ratio) and of 205° C. in Tg was used, a transparent conductive substrate was obtained in the same manner as in Example 2. The evaluation results of the obtained transparent conductive substrate were good as shown in Table 2.

Example 6

Except that the layer (P) and the layer (U) were laminated by using a coating composition prepared as shown below, a transparent conductive substrate was obtained in the same manner as in Example 5.

A homogeneous solution of the component (P1) EVOH was obtained by the same process as in Example 1. After the addition of 0.1 part of the leveling agent used in Example 1 and 28 parts of acetic acid to the obtained solution, 229 parts of the component (P2) ECHETMOS was added, and the mixture was stirred for 10 min. To the obtained solution was further added 56 parts of the component (P3) APTMOS, and the mixture was stirred for 3 hr to obtain the coating composition.

The composition of the coating composition satisfied the following equations: (P1)/[(P2)+(P3)]=1/2 (after hardening) and (P2)/(P3)=3/1.

The evaluation results of the obtained transparent conductive substrate were good as shown in Table 2.

Example 7

Except that a layer (1000 Å thick) consisting of a silicon oxide containing magnesium fluoride in an amount of 10% by weight was prepared by an evaporation method as the gas barrier layer (X), a transparent conductive substrate was obtained in the same manner as in Example 6. The evaluation results of the obtained transparent conductive substrate were good as shown in Table 2.

TABLE 2

| | | Example 5 | Example 6 | Example 7 |
|---|---|---|---|---|
| Substrate Construction | composition | E/U/S/B/X/C BisA/IP-PC(2/3) | E/U/S/B/X/C BisA/IP-PC(2/3) | E/U/S/B/X/C BisA/IP-PC(2/3) |
| | film thickness ($\mu$m) | 200 | 200 | 200 |
| E-layer | composition | ITO | ITO | ITO |
| | film thickness ($\mu$m) | 1300 | 1300 | 1300 |
| X-layer | composition | $SiO_2$ | $SiO_2$ | $SiO_2 + MgF_2$ |
| | film thickness ($\mu$m) | 250 | 250 | 1000 |
| B-layer | composition | Q | Q | Q |
| | (B1) PVA polymer | — | — | — |
| | (B2) epoxy silane | ECHETMOS | ECHETMOS | ECHETMOS |
| | (B3) amino silane | APTMOS | APTMOS | APTMOS |
| | (B1)/[(B2) + (B3)] | 0/1 | 0/1 | 0/1 |
| | (B2)/(B3) | 3/1 | 3/1 | 3/1 |
| | film thickness ($\mu$m) | 0.05 | 0.05 | 0.05 |
| C-layer | composition | P | P | P |
| | (C1) PVA | EVOH | EVOH | EVOH |
| | polymer | ECHETMOS | ECHETMOS | ECHETMOS |
| | (C2) epoxy silane | APTMOS | APTMOS | APTMOS |
| | (C3) amino silane | 1/2 | 1/2 | 1/2 |
| | (C1)/[(C2) + (C3)] | 2/1 | 3/1 | 3/1 |
| | (C2)/(C3) | | | |
| | film thickness ($\mu$m) | 2 | 2 | 2 |
| U-layer | composition | Q (same as C-layer in Example 1) | P (same as C-layer in Example 6) | P (same as C-layer in Example 6) |
| | film thickness ($\mu$m) | 2 | 2 | 2 |
| Surface electric resistivity of U-layer ($\Omega/\square$) | 50° C. 30% RH | $2 \times 10^{15}$ | $5 \times 10^{14}$ | $5 \times 10^{14}$ |
| | 50° C. 90% RH | $2 \times 10^{13}$ | $2 \times 10^{12}$ | $2 \times 10^{12}$ |
| Water vapor transmission (g/m²/day) | | <0.1 | <0.1 | <0.1 |
| Water absorption coefficient (%) | transparent conductive substrate | <1 | <1 | <1 |
| | S-substrate | 0.2 | 0.2 | 0.2 |
| | B-layer | 2 | 2 | 2 |
| IR spectrum of U-layer ($cm^{-1}/cm^{-1}$) | (a)/(b) | 0.55 | 0.76 | 0.76 |
| | (c)/(b) | 0.13 | 0.31 | 0.31 |
| | (d)/(b) | 1.4 | 0.82 | 0.82 |
| Total light transmittance (%) | | 86 | 86 | 85 |
| Retardation (nm) | | 9 | 9 | 9 |
| Interlayer adhesivity [cross cut test] | | no peeling | no peeling | no peeling |
| Liquid crystal panel reliability [cell impedance] | | almost no change | almost no change | almost no change |

Example 8

Except that the hardened resin layer (U) was laminated at a thickness of 4 $\mu$m by the method shown below, a transparent conductive substrate was obtained in the same manner as in Example 2.

A coating composition was obtained by mixing 10 parts of DCPA, 10 parts of EA, 10 parts of UA, 30 parts of 1-methoxy-2-propanol and 2 parts of 1-hydroxycyclohexyl phenyl ketone as an initiator, by weight. By applying the obtained composition and heating at 60° C. for 1 min followed by irradiation with a high-pressure mercury lamp, the hardened resin layer (U) was formed.

The evaluation results of the obtained transparent conductive substrate were good as shown in Table 3.

Example 9

Except that the hardened resin layer (U) was laminated at a thickness of 4 $\mu$m by the method shown below, a transparent conductive substrate was obtained in the same manner as in Example 2.

A coating composition was obtained by mixing 20 parts of DCPA, 10 parts of UA, 30 parts of 1-methoxy-2-propanol and 2 parts of 1-hydroxycyclohexyl phenyl ketone as an initiator, by weight. By applying the obtained composition and heating at 60° C. for 1 min followed by irradiation with a high-pressure mercury lamp, the hardened resin layer (U) was formed.

The evaluation results of the obtained transparent conductive substrate were good as shown in Table 3.

Example 10

Except that the layer (Q) was not formed between the S and the layer (X), a transparent conductive substrate was obtained in the same manner as in Example 2.

The evaluation results of the obtained transparent conductive substrate exhibited that although the interlayer adhesivity between the substrate (S) and the layer (X) was somewhat insufficient, the reliability of the liquid crystal panel prepared by using the substrate was relatively good, as shown in Table 3.

Example 11

Except that the layer (P) was not formed, a transparent conductive substrate was obtained in the same manner as in Example 2. The evaluation results of the obtained transparent conductive substrate were good as shown in Table 3.

TABLE 3

| | | Example 8 | Example 9 | Example 10 | Example 11 |
|---|---|---|---|---|---|
| Substrate Construction | | E/U/S/B/X/C | E/U/S/B/X/C | E/U/S/X/C | E/U/S/B/X |
| S-substrate | composition | BisA-PC | BisA-PC | BisA-PC | BisA-PC |
| | film thickness ($\mu$m) | 100 | 100 | 100 | 100 |
| E-layer | composition | ITO | ITO | ITO | ITO |
| | film thickness ($\mu$m) | 1300 | 1300 | 1300 | 1300 |
| X-layer | composition | SiO$_2$ | SiO$_2$ | SiO$_2$ | SiO$_2$ |
| | film thickness ($\mu$m) | 250 | 250 | 250 | 250 |
| B-layer | composition | Q | Q | — | Q |
| | (B1) PVA polymer | ECHETMOS | ECHETMOS | | ECHETMOS |
| | (B2) epoxy silane | APTMOS | APTMOS | | APTMOS |
| | (B3) amino silane | 0/1 | 0/1 | | 0/1 |
| | (B1)/[(B2) + (B3)] | 3/1 | 3/1 | | 3/1 |
| | (B2)/(B3) | | | | |
| | film thickness ($\mu$m) | 0.05 | 0.05 | — | 0.05 |
| C-layer | composition | P | P | P | — |
| | (C1) PVA polymer | EVOH | EVOH | ECHETMOS | |
| | (C2) epoxy silane | ECHETMOS | ECHETMOS | APTMOS | |
| | (C3) amino silane | APTMOS | APTMOS | EVOH | |
| | (C1)/[(C2) + (C3)] | 1/2 | 1/2 | 1/2 | |
| | (C2)/(C3) | 2/1 | 2/1 | 2/1 | |
| | film thickness ($\mu$m) | 2 | 2 | 2 | — |
| U-layer | composition | DCPA/EA/UA = 1/1/1 | DCPA/UA = 2/1 | P (same as C-layer in Example 2) | P (same as C-layer in Example 2) |
| | film thickness ($\mu$m) | 4 | 4 | 2 | 2 |
| Surface electric resistivity of U-layer ($\Omega/\square$) | 50° C. 30% RH | $3 \times 10^{16}$ | $5 \times 10^{16}$ | $2 \times 10^{15}$ | $2 \times 10^{15}$ |
| | 50° C. 90% RH | $3 \times 10^{13}$ | $5 \times 10^{13}$ | $2 \times 10^{13}$ | $2 \times 10^{13}$ |
| Water vapor transmission (g/m$^2$/day) | | <0.1 | <0.1 | 1.0 | 1.0 |
| Water absorption coefficient (%) | transparent conductive substrate | <1 | <1 | <1 | <1 |
| | S-substrate | 0.25 | 0.25 | 0.25 | 0.25 |
| | B-layer | 2 | 2 | 2 | 2 |
| IR spectrum of U-layer (cm$^{-1}$/cm$^{-1}$) | (a)/(b) | — | — | 0.55 | 0.55 |
| | (c)/(b) | — | — | 0.13 | 0.13 |
| | (d)/(b) | — | — | 1.4 | 1.4 |
| Total light transmittance (%) | | 86 | 86 | 86 | 86 |
| Retardation (nm) | | 8 | 8 | 8 | 8 |
| Interlayer adhesivity[cross cut test] | | no peeling | no peeling | partly peeled between S/X | no peeling |
| Liquid crystal panel reliability [cell impedance] | | almost no change | almost no change | somewhat lowered | somewhat lowered |

Comparative Example 1

Except that the layer (P) and the layer (U) were laminated by using a coating composition prepared as shown below, a transparent conductive substrate was obtained in the same manner as in Example 1.

After the addition of 353 parts by weight of acetic acid to a mixed solvent of 720 parts of water and 1080 parts of 2-propanol by weight, 478 parts of the (Q1) ECHETMOS and 706 parts of the (Q2) APTMOS by weight were each serially added, and the mixture was stirred for 3 hr to obtain the coating composition. The composition of the coating composition satisfied the following equation: (Q1)/(Q2)=1/2.

The results of the evaluation of the obtained transparent conductive substrate exhibited that the surface insulation resistance of the lower layer of the transparent conductive layer (E) at 50° C. 90% RH was low, and the reliability of the liquid crystal panel prepared by using the substrate was poor, as shown in Table 4.

Comparative Example 2

Except that the PES 200 μm thick prepared by the melt extrusion molding was used as the transparent polymer substrate (S), a transparent conductive substrate was obtained in the same manner as in Example 8.

The results of the evaluation of the obtained transparent conductive substrate exhibited that the water absorption coefficient of the substrate was high, and the reliability of the liquid crystal panel prepared by using the substrate was also poor, as shown in Table 4.

TABLE 4

| | | Comparative Example 1 | Comparative Example 2 |
|---|---|---|---|
| Substrate Construction | | E/U/S/B/X/C | E/U/S/B/X/C |
| S-substrate | composition | BisA-PC | PES |
| | film thickness (μm) | 100 | 100 |
| E-layer | composition | ITO | ITO |
| | film thickness (μm) | 1300 | 1300 |
| X-layer | composition | $SiO_2$ | $SiO_2$ |
| | film thickness (μm) | 250 | 250 |
| B-layer | composition | P | Q |
| | (B1) PVA polymer | EVOH | — |
| | (B2) epoxy silane | ECHETMOS | ECHETMOS |
| | (B3) amino silane | APTMOS | APTMOS |
| | (B1)/[(B2) + (B3)] | 1/2 | 0/1 |
| | (B2)/(B3) | 2/1 | 3/1 |
| | film thickness (μm) | 0.05 | 0.05 |
| C-layer | composition | Q | P |
| | (C1) PVA polymer | — | EVOH |
| | (C2) epoxy silane | ECHETMOS | ECHETMOS |
| | (C3) amino silane | APTMOS | APTMOS |
| | (C1)/[(C2) + (C3)] | 0/1 | 1/2 |
| | (C2)/(C3) | 1/2 | 2/1 |
| | film thickness (μm) | 2 | 2 |
| U-layer | composition | Q (same as C-layer in Example 1) | DCPA/EA/UA = 1/1/1 |
| | film thickness (μm) | 2 | 4 |
| Surface electric resistivity of U-layer (Ω/□) | 50° C. 30% RH | $5 \times 10^{13}$ | $3 \times 10^{16}$ |
| | 50° C. 90% RH | $5 \times 10^{10}$ | $3 \times 10^{13}$ |
| Water vapor transmission (g/m²/day) | | <0.1 | <0.1 |
| Water absorption coefficient (%) | transparent conductive substrate | <1 | 3 |
| | S-substrate | 0.25 | 2.4 |
| | B-layer | 4 | 2 |
| IR spectrum of U-layer ($cm^{-1}/cm^{-1}$) | (a)/(b) | 0.90 | — |
| | (c)/(b) | 1.2 | — |
| | (d)/(b) | 1.4 | — |
| Total light transmittance (%) | | 86 | 84 |
| Retardation (nm) | | 8 | 8 |
| Interlayer adhesivity [cross cut test] | | no peeling | no peeling |
| Liquid crystal panel reliability [cell impedance] | | extremely lowered | extremely lowered |

Industrial Field of Application

As shown above, the liquid crystal display component of the present invention is resistant to the deterioration of the display quality for a long time and has an extremely high reliability since a transparent conductive substrate containing a hardened resin layer, which is placed in the lower layer of a transparent conductive layer and has an excellent insulation characteristic in a high-temperature and high-humidity environment, is used as an electrode substrate. Further, the transparent conductive substrate is excellent also in a gas barrier property, and it can be used suitably as an electrode substrate in the field of a flat panel display such as a photosensitive conductor, a surface light emitter, an EL-display or the like.

What is claimed is:

1. A liquid crystal display component comprising a pair of electrode substrates and a liquid crystal layer placed between the electrode substrates, wherein the electrode substrates are characterized in that (i) the electrode substrates comprise each a transparent polymer substrate (S), a gas barrier layer (X), a hardened resin layer (U) and a transparent conductive layer (E), (ii) the hardened resin layer (U) and the transparent conductive layer (E) are in contact with each other, (iii) the electrode substrates have a water absorption coefficient of 2% or less, (iv) the electrode substrates have a water vapor transmission of 1 g/m$^2$/day or less in an environment of 40° C. and 90% RH, and (v) the surface in contact with the transparent conductive layer (E) of the hardened resin layer (U) has a surface electric resistivity of $1.0 \times 10^{13}$ Ω/□ or more in an environment of 50° C. and 30% RH and that of $1.0 \times 10^{12}$ Ω/□ or more in an environment of 50° C. and 90% RH.

2. A liquid crystal display component according to claim 1, wherein the hardened resin layer (U) comprises a silicon-containing resin satisfying the following formulae (1), (2) and (3):

$$0.01 < (a)/(b) < 1.0 \qquad (1)$$

$$0.01 < (c)/(b) < 0.5 \qquad (2)$$

$$0.01 < (d)/(b) < 2.0 \qquad (3)$$

herein (a) is the absorbance assigned to an O—H stretching vibration existing near 3500 cm$^{-1}$, (b) is the absorbance assigned to a C—H stretching vibration existing near 3000 cm$^{-1}$, (c) is the absorbance assigned to an —NH$_2$ in-plain deformation vibration existing near 1600 cm$^{-1}$ and (d) is the absorbance attributable to an Si—O existing near 1100 cm$^{-1}$, in infrared absorption spectrum.

3. A liquid crystal display component according to claim 2, wherein the silicon-containing resin is a vinyl alcohol-containing polysiloxane resin (P) obtainable from a coating composition containing a vinyl alcohol polymer, an epoxy group-containing silicon compound and an amino group-containing silicon compound or an organic polysiloxane resin (Q) obtainable from a coating composition containing an epoxy group-containing silicon compound and an amino group-containing silicon compound.

4. A liquid crystal display component according to claim 1, wherein the electrode substrate further contains a hardened resin layer (B) and a hardened resin layer (C), and the transparent polymer substrate (S), the hardened resin layer (B), the gas barrier layer (X) and the hardened resin layer (C) are in contact with each other in this order.

5. A liquid crystal display component according to claim 4, wherein the hardened resin layer (B) comprises a vinyl alcohol-containing polysiloxane resin (P) obtainable from a coating composition containing a vinyl alcohol polymer, an epoxy group-containing silicon compound and an amino group-containing silicon compound or an organic polysiloxane resin (Q) obtainable from a coating composition containing an epoxy group-containing silicon compound and an amino group-containing silicon compound, and the hardened resin layer (C) comprises the above-mentioned (P) or (Q).

6. A liquid crystal display component according to claim 1, wherein the gas barrier layer (X) comprises a metal oxide mainly composed of a silicon oxide having a ratio of the number of oxygen atoms to the number of silicon atoms of 1.5 to 2.0.

7. A liquid crystal display component according to claim 1, wherein the transparent polymer substrate (S) is mainly composed of polycarbonate or polyacrylate, and has a total light transmittance of 80% or more and a retardation of 20 nm or less.

8. A liquid crystal display component comprising a pair of electrode substrates and a liquid crystal layer placed between the electrode substrates, wherein the electrode substrates are characterized in that (i) the electrode substrates is constructed with a transparent conductive layer (E), a hardened resin layer (U), a transparent polymer substrate (S), a hardened resin layer (B), a gas barrier layer (X) consisting of a metal oxide, a metal nitride or their mixture and a hardened resin layer (C) in this order, (ii) the hardened resin layer (U) and the transparent conductive layer (E) are in contact with each other, (iii) the electrode substrates have a water absorption coefficient of 2% or less, (iv) the electrode substrates have a water vapor transmission of 0.1 g/m$^2$/day or less in an environment of 40° C. and 90% RH, and (v) the surface in contact with the transparent conductive layer (E) of the hardened resin layer (U) has a surface electric resistivity of $1.0 \times 10^{13}$ Ω/□ or more in an environment of 50° C. and 30% RH and that of $1.0 \times 10^{12}$ Ω/□ or more in an environment of 50° C. and 90% RH.

9. A liquid crystal display component according to claim 8, wherein the hardened resin layer (U) comprises a silicon-containing resin satisfying the following formulae (1), (2) and (3):

$$0.01 < (a)/(b) < 1.0 \qquad (1)$$

$$0.01 < (c)/(b) < 0.5 \qquad (2)$$

$$0.01 < (d)/(b) < 2.0 \qquad (3),$$

herein (a) is the absorbance assigned to an O—H stretching vibration existing near 3500 cm$^{-1}$, b)is the absorbance assigned to a C—H stretching vibration existing near 3000 cm$^{-1}$, (c) is the absorbance assigned to an —NH$_2$ in-plain deformation vibration existing near 1600 cm$^{-1}$ and (d) is the absorbance attributable to an Si—O existing near 1100 cm$^{-1}$, in infrared absorption spectrum.

10. A liquid crystal display component according to claim 9, wherein the silicon-containing resin comprises a vinyl alcohol-containing polysiloxane resin (P) obtainable from a coating composition containing a vinyl alcohol polymer, an epoxy group-containing silicon compound and an amino group-containing silicon compound or an organic polysiloxane resin (Q) obtainable from a coating composition containing an epoxy group-containing silicon compound and an amino group-containing silicon compound, the hardened resin layer (B) comprises the above-mentioned (P) or (Q), and the hardened resin layer (C) comprises the above-mentioned (P).

11. A transparent conductive substrate comprising a gas barrier laminated film, which comprises a transparent polymer substrate (S), a gas barrier layer (X) consisting of a metal oxide, a metal nitride or their mixture, and a hardened resin layer (U), and a transparent conductive layer (E), which is placed in contact with the hardened resin layer (U) of the laminated film, and satisfying the following (i) to (vii):

(i) the water absorption coefficient is 2% or less, (ii) the total light transmittance is 80% or more, (iii) the thickness of the transparent polymer substrate (S) is 0.01 to 1.0 mm, (iv) the retardation of the transparent polymer substrate (S) is 20 nm or less, (v) the thickness of the gas barrier layer (X) is 5 to 200 nm, (vi) the thickness of the transparent conductive layer (E) is 1 nm to 1 μm.

(vii) the surface in contact with the transparent conductive layer (E) of the hardened resin layer (U) has a surface electric resistivity of $1.0 \times 10^{13}$ Ω/□ or more in an environment of 50° C. and 30% RH and that of $1.0 \times 10^{12}$ Ω/□ or more in an environment of 50° C. and 90% RH.

12. A transparent conductive substrate according to claim 11, wherein the hardened resin layer (U) comprises a silicon-containing resin satisfying the following formulae (1), (2) and (3):

$$0.01 < (a)/(b) < 1.0 \quad (1)$$

$$0.01 < (c)/(b) < 0.5 \quad (2)$$

$$0.01 < (d)/(b) < 2.0 \quad (3),$$

herein (a) is the absorbance assigned to an O—H stretching vibration existing near 3500 cm$^{-1}$, (b) is the absorbance assigned to a C—H stretching vibration existing near 3000 cm$^{-1}$, (c) is the absorbance assigned to an —NH$_2$ in-plain deformation vibration existing near 1600 cm$^{-1}$ and (d) is the absorbance attributable to an Si—O existing near 1100 cm$^{-1}$, in infrared absorption spectrum.

13. A transparent conductive substrate according to claim 12, wherein the silicon-containing resin is a vinyl alcohol-containing polysiloxane resin (P) obtainable from a coating composition containing a vinyl alcohol polymer, an epoxy group-containing silicon compound and an amino group-containing silicon compound or an organic polysiloxane resin (Q) obtainable from a coating composition containing an epoxy group-containing silicon compound and an amino group-containing silicon compound.

14. A transparent conductive substrate according to claim 11, wherein the laminated film has a water vapor transmission of 1 g/m$^2$/day or less in an environment of 40° C. and 90% RH.

15. A transparent conductive substrate according to claim 11, wherein a hardened resin layer (B) is placed on the opposite side to the side where the hardened resin layer (U) of the transparent polymer substrate (S) is placed in such a manner that the (B) is in contact with the (S), and the water absorption coefficient of the (B) is larger than that of the (S).

16. A transparent conductive substrate according to claim 15, wherein the water absorption coefficient of the transparent polymer substrate (S) is 1% or less.

17. A transparent conductive substrate according to claim 15, wherein the hardened resin layer (B) comprises a vinyl alcohol-containing polysiloxane resin (P) obtainable from a coating composition containing a vinyl alcohol polymer, an epoxy group-containing silicon compound and an amino group-containing silicon compound or an organic polysiloxane resin (Q) obtainable from a coating composition containing an epoxy group-containing silicon compound and an, amino group-containing silicone compound.

18. A transparent conductive substrate according to claim 11, wherein the laminated film further contains a hardened resin layer (B) and a hardened resin layer (C), and the gas barrier layer (X) is placed in contact with the hardened resin layer (B) and the hardened resin layer (C).

19. A transparent conductive substrate according to claim 18, wherein the hardened resin layer (B) comprises a vinyl alcohol-containing polysiloxane resin (P) obtainable from a coating composition containing a vinyl alcohol polymer, an epoxy group-containing silicon compound and an amino group-containing silicon compound or an organic polysiloxane resin (Q) obtainable from a coating composition containing an epoxy group-containing silicon compound and an amino group-containing silicon compound, and the hardened resin layer (C) comprises the above-mentioned (P) or (Q).

20. A transparent conductive substrate according to claim 19, wherein the thickness of the gas barrier layer (X) is in the range of 5 to 50 nm.

21. A transparent conductive substrate according to claim 11, wherein the metal oxide is composed mainly of a silicon oxide having a ratio of the number of oxygen atoms to that of silicon atoms of 1.5 to 2.0.

22. A transparent conductive substrate according to claim 11, wherein the transparent polymer substrate (S) is mainly composed of polycarbonate or polyacrylate, and has a total light transmittance of 80% or more, and a retardation of 20 nm or less.

23. A transparent conductive substrate according to claim 11, wherein the hardened resin layer (A) is placed between the hardened resin layer (U) and the transparent polymer substrate (S) in such a manner that the (A) is in contact with the (U) and (S).

24. A transparent conductive substrate, wherein a gas barrier laminated film is constructed of a hardened resin layer (U), a hardened resin layer (A), a transparent polymer substrate (S), a hardened resin layer (B), a gas barrier layer (X) comprising a metal oxide, a metal nitride or their mixture, and a hardened resin layer (C) which are in contact with each other in this order, a transparent conductive layer (E) is placed on the hardened resin layer (U) of the gas barrier laminated film in contact with the (U), and the transparent conductive substrate satisfies the following (i) to (viii):

(i) the water absorption coefficient is 2% or less, (ii) the total light transmittance is 80% or more, (iii) the thickness of the transparent polymer substrate (S) is 0.01 to 1.0 mm, (iv) the retardation of the transparent polymer substrate (S) is 20 nm or less, (v) the thickness of the gas barrier layer ( is 5 to 50 nm, (vi) the thickness of the transparent conductive layer (E) is 1 nm to 1 μm, (vii) the surface in contact with the transparent conductive layer (E) of the hardened resin layer (U) has a surface electric resistivity of $1.0 \times 10^{13}$ Ω/□ or more in an environment of 50° C. and 30% RH and that of $1.0 \times 10^{12}$ Ω/□ or more in an environment of 50° C. and 90% RH, and (viii) the laminated film has a water vapor transmission of 0.1 g/m$^2$/day or less in an environment of 40° C. and 90% RH.

25. A transparent conductive substrate according to claim 24, wherein the hardened resin layer (U) comprises a vinyl alcohol-containing polysiloxane resin (P) obtainable from a coating composition containing a radiation curing resin, or a vinyl alcohol polymer, an epoxy group-containing silicon compound and an amino group-containing silicon compound or an organic polysiloxane resin (Q) obtainable from a coating composition containing an epoxy group-containing silicon compound and an amino group-containing silicon compound, the hardened resin layer (B) comprises the above-mentioned (P) or (Q), and the hardened resin layer (C) comprises the above-mentioned (P) or (Q).

26. A transparent conductive substrate, wherein a gas barrier laminated film is constructed of a hardened resin layer (U), a hardened resin layer (A), a transparent polymer substrate (S), a hardened resin layer (B), a gas barrier layer (X) comprising a metal oxide mainly composed of silicon oxide and a hardened resin layer (C) which are in contact with each other in this order, a transparent conductive layer (E) is placed on the hardened resin layer (U) of the gas barrier laminated film in contact with the (U), and the transparent conductive substrate satisfies the following (i) to (x):

(i) the water absorption coefficient is 2% or less, (ii) the total light transmittance is 80% or more, (iii) the thickness of the transparent polymer substrate (S) is 0.01 to 1.0 mm, (iv) the retardation of the transparent polymer substrate (S) is 20 nm or less, (v) the thickness of the gas barrier layer (X) is 5 to 200 nm, (vi) the thickness of the transparent conductive layer (E) is 1 nm to 1 μm, (vii) the hardened resin layer (U) comprises a vinyl alcohol-containing polysiloxane resin (P) obtainable from a coating composition containing a vinyl alcohol polymer, an epoxy group-containing silicon compound and an amino group-containing silicon compound or an organic polysiloxane resin (Q) obtainable from a coating composition containing an epoxy group-containing silicon compound and an amino group-containing silicon compound, and satisfies the following formulae (1), (2) and (3):

$$0.01 < (a)/(b) < 1.0 \tag{1}$$

$$0.01 < (c)/(b) < 0.5 \tag{2}$$

$$0.01 < (d)/(b) < 2.0 \tag{3},$$

herein (a) is the absorbance assigned to an O—H stretching vibration existing near 3500 $cm^{-1}$, (b) is the absorbance assigned to a C—H stretching vibration existing near 3000 $cm^{-1}$, (c) is the absorbance assigned to an —$NH_2$ in-plain deformation vibration existing near 1600 $cm^{-1}$ and (d) is the absorbance attributable to an Si—O existing near 1100 $cm^{-1}$, in infrared absorption spectrum, (viii) the hardened resin layer (B) comprises the above-mentioned (P) or (Q), (ix) the hardened resin layer (C) comprises the above-mentioned (P), and (x) the hardened resin layer (A) comprises a urethane resin.

* * * * *